United States Patent
Dellaferrera et al.

(10) Patent No.: US 12,020,162 B2
(45) Date of Patent: Jun. 25, 2024

(54) WEIGHT-BASED LOCAL MODULATION OF WEIGHT UPDATE IN NEURAL NETWORKS

(71) Applicant: International Business Machines Corporation, Armonk, NY (US)

(72) Inventors: Giorgia Dellaferrera, Zurich (CH); Stanislaw Andrzej Wozniak, Zilchberg (CH); Angeliki Pantazi, Thalwil (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 17/106,356

(22) Filed: Nov. 30, 2020

(65) Prior Publication Data
US 2022/0172058 A1  Jun. 2, 2022

(51) Int. Cl.
   *G06N 3/082* (2023.01)
   *G06N 3/047* (2023.01)
   *G06N 3/084* (2023.01)

(52) U.S. Cl.
   CPC .......... *G06N 3/082* (2013.01); *G06N 3/047* (2023.01); *G06N 3/084* (2013.01)

(58) Field of Classification Search
   CPC ........ G06N 3/045; G06N 3/047; G06N 3/082; G06N 3/084
   See application file for complete search history.

(56) References Cited

U.S. PATENT DOCUMENTS

| | | | |
|---|---|---|---|
| 2018/0300629 A1 | 10/2018 | Kharaghani | |
| 2019/0050727 A1 | 2/2019 | Anderson | |
| 2019/0138896 A1 | 5/2019 | Deng | |
| 2019/0340500 A1* | 11/2019 | Olmschenk | G06N 3/04 |
| 2020/0019862 A1* | 1/2020 | Pescianschi | G06N 3/082 |

(Continued)

FOREIGN PATENT DOCUMENTS

| | | |
|---|---|---|
| CN | 116569177 A | 8/2023 |
| DE | 112021006212 T5 | 9/2023 |

(Continued)

OTHER PUBLICATIONS

Nokland, "Direct Feedback Alignment Provides Learning in Deep Neural Networks", Dec. 21, 2016, 30th Conference on Neural Information Processing Systems (NIPS 2016), pp. 1-9 (Year: 2016).*

(Continued)

*Primary Examiner* — Brent Johnston Hoover
(74) *Attorney, Agent, or Firm* — Daniel J Biabolil

(57) ABSTRACT

Training a neural network that comprises nodes and weighted connections between selected ones of the nodes is described herein. A function of a desired activity and a current activity during training results in a feedback signal used for adjusting weight values of the connections. For a weight value update cycle the process determines an importance value for various nodes based on current weight values of the connections and determines an adjustment of the feedback signal specific for each weight value of the connections by a combination of a gradient value derived from the feedback signal for a connection and the determined corresponding element of the adjustment matrix. The updates are applied to the connections during update cycles.

24 Claims, 8 Drawing Sheets

(56) References Cited

U.S. PATENT DOCUMENTS

| | | | |
|---|---|---|---|
| 2020/0218982 A1 | 7/2020 | Annau | |
| 2020/0293855 A1 | 9/2020 | Le Gallo-Bourdeau | |

FOREIGN PATENT DOCUMENTS

| | | | |
|---|---|---|---|
| GB | 2615919 A | 8/2023 | |
| JP | 2023550921 A | 12/2023 | |
| WO | 2016062044 A1 | 4/2016 | |
| WO | 2020196066 A1 | 10/2020 | |
| WO | 2022112888 A1 | 6/2022 | |

OTHER PUBLICATIONS

Bisong, Ekaba, "Chapter 33 More on Optimization Techniques", E. Bisong, Building Machine Learning and Deep Learning Models on Google Cloud Platform, https://doi.org/10.1007/978-1-4842-4470-8_33, 2019, 3 pages.

Darken et al., "Note on Learning Rate Schedules for Stochastic Optimization", Yale University, New Haven, CT, 1990, 7 pages.

Lee et al., "Amyloid Beta Immunoreactivity in the Retinal Ganglion Cell Layer of the Alzheimer's Eye", Frontiers in Neuroscience, published: Jul. 31, 2020, 14 pages.

Li et al., "Budgeted Training: Rethinking Deep Neural Network Training Under Resource Constraints", Published as a conference paper at ICLR 2020, arXiv:1905.04753v4 [cs.CV] Jun. 30, 2020, 20 pages.

Lillicrap et al., "Random synaptic feedback weights support error backpropagation for deep learning", Nature Communications, Published Nov. 8, 2016, 10 pages.

Nokland, Arild, "Direct Feedback Alignment Provides Learning in Deep Neural Networks", 30th Conference on Neural Information Processing Systems (NIPS 2016), Barcelona, Spain, 9 pages.

Rumelhart et al., "Learning representations by back-propagating errors", © 1986 Nature Publishing Group, 4 pages.

Singh et al., "Layer-Specific Adaptive Learning Rates for Deep Networks", arXiv:1510.04609v1 [cs.CV] Oct. 15, 2015, 5 pages.

Vaswani et al., "Fast and Faster Convergence of SGD for Over-Parameterized Models (and an Accelerated Perceptron)", Proceedings of the 22nd International Conference on Artificial Intelligence and Statistics (AISTATS) 2019, Naha, Okinawa, Japan, arXiv:1810.7288v3 [cs.LG] Apr. 5, 2019, 23 pages.

Whittington et al., "Theories of Error Back-Propagation in the Brain", Trends in Cognitive Sciences, Mar. 2019, vol. 23, No. 3, https://doi.org/10.1016/j.tics.2018.12.005, 16 pages.

Yedida et al., "A novel adaptive learning rate scheduler for deep neural networks", arXiv:1902.07399v1 [cs.LG] Feb. 20, 2019, 14 pages.

Zhang et al., "Train Feedfoward Neural Network with Layer-wise Adaptive Rate via Approximating Back-matching Propagation", arXiv:1802.09750v1 [stat.ML] Feb. 27, 2018, 12 pages.

"Patent Cooperation Treaty PCT International Search Report", Applicant's file reference P202005297, International application No. PCT/IB2021/060196, International filing date Nov. 4, 2021, Date of mailing Feb. 17, 2022, 6 pages.

\* cited by examiner

100

┌─────────────────────────────────────────┐
│ 102   determining an importance value   │
│       for each node                     │
└─────────────────────────────────────────┘
                    │
                    ▼
┌─────────────────────────────────────────┐
│ 104   determining an adjustment matrix ...│
└─────────────────────────────────────────┘
                    │
                    ▼
┌─────────────────────────────────────────┐
│ 106   determining an updated value specific│
│       for each weight value of the connections│
└─────────────────────────────────────────┘
                    │
                    ▼
┌─────────────────────────────────────────┐
│ 108   applying the updates to the connections│
│       during every update cycle         │
└─────────────────────────────────────────┘

FIG. 1

WEIGHT-BASED LOCAL MODULATION OF WEIGHT UPDATE IN NEURAL NETWORKS

BACKGROUND

The invention relates generally to a computer-implemented method for training of a neural network, and more specifically, to a neural network comprising nodes and weighted connections between selected nodes.

In the research community as well as in enterprise IT (information technology) organizations, AI (artificial intelligence) and machine learning are currently at the edge of becoming a mainstream technology. Several approaches have been applied as effective tools for machine learning. For a certain class of problems, artificial neural networks (ANN) or deep neural networks (DNN) may be well suited as technical architecture to support artificial intelligence applications.

Neural networks require training—which may be supervised, semi-supervised or, unsupervised—before they may be used for inference tasks such as classification or prediction. Typically, today, supervised learning techniques are used which may require a plurality of annotated training data. During training, based on input data, the neural network produces one or more output signals which can be compared to the desired outcome, i.e., the annotation. A function between the two may be used to adjust weight factor values of connections or edges between the nodes of the different layers of the neural network.

Backpropagation is currently the most used algorithm for training deep neural networks in a wide variety of tasks. Different techniques have been developed to address the weight transport and symmetry problems of backpropagation (BP). Among them are: feedback alignment (FA), direct and indirect feedback alignment (DFA, IFA).

In order to minimize the loss function, BP, FA, DFA and IFA rely on the method of stochastic gradient descent (SGD) and other optimizers. Basically, SGD may direct the combined set of weight values learnt towards a global or local minimum within the variant's space. Thereby, the SGD convergence strongly depends on the learning rate ($\eta$). The learning rate schedule approach may improve the convergence but may require also a time-consuming manual tuning and adapting hyperparameters and, at each step, it keeps the learning rate equal for all the parameters.

Some optimizers, such as momentum-based optimizers, may perform inhomogeneous updates, but may also require storing the momentum estimates in the memory, i.e., main memory of the underlying computer system. This may be a reason for the higher computational costs of such approaches.

Hence, the existing modifications of classical SGD introduced to improve the convergence rate require disadvantageously either manual tuning of hyperparameters or additional memory.

Parameter training for image retrieval or image classification is known. Using model parameters to carry out iterative computation on an objective function, wherein the objective function is a cost function used for image training, is known.

The increasing complexity of deep learning architectures may result in longer and longer training times that require weeks or even months due to "vanishing gradients." Training a deep neural network that uses learning rates that are specific to each layer and the network and that are adaptive to the curvature of the function, increasing the learning rate at low curvature points is known.

SUMMARY

In one aspect of the present invention, a method, a computer program product, and a system for training a neural network includes: (i) determining a set of importance values for a set of nodes of a neural network based on corresponding weight values of the weighted connections between selected nodes of the set of nodes; (ii) determining an adjustment matrix comprising connection values dependent on the determined importance values of the set of nodes; (iii) determining a first updated value for a first weight value of a first weighted connection by a combination of a gradient value derived from a feedback signal for the first weighted connection and a corresponding element of the adjustment matrix, the feedback signal representing a function of a desired activity and a current activity of the first weighted connection during a first training cycle; and (iv) applying an update to the weighted connections including the first weighted connection according to the adjustment matrix including the first updated value.

According to one aspect of the present invention, a computer-implemented method for a training of a neural network which may comprise nodes and weighted connections between selected ones of the nodes may be provided. Thereby, a function of a desired activity and a current activity during training results in a feedback signal which may be used for adjusting weight values of the connections for every weight value update cycle.

The method may comprise, for every update cycle, determining an importance value for each node based on current weight values of the connections, and determining an adjustment matrix comprising values dependent on the determined importance values. Furthermore, the method may comprise, for every update cycle, determining a local updated value specific for each weight value of the connections by a combination of a gradient value derived from the feedback signal for a connection and the determined corresponding element of the adjustment matrix, and applying the updates to the connections during every update cycle.

According to another aspect of the present invention, a neural network training system for training of a neural network which may comprise nodes and weighted connections between selected ones of the nodes may be provided. Thereby, a function of a desired activity and a current activity during training results in a feedback signal that may be used for adjusting weight values of the connections.

The system may comprise a memory and a processor, wherein the memory stores program code portions for enabling the processor for every update cycle to: determine an importance value for each node based on current weight values of the connections, determine an adjustment matrix comprising values dependent on the determined importance values; determine a local updated value specific for each weight value of the connections by a combination of a gradient value derived from the feedback signal for a connection and the determined corresponding element of the adjustment matrix, and apply the updates to the connections during every update cycle

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Some embodiments of the present invention will be described, by way of example only, and with reference to the following drawings:

FIG. 1 shows a block diagram of an embodiment of the inventive computer-implemented method for a training of a neural network.

Figure 2:
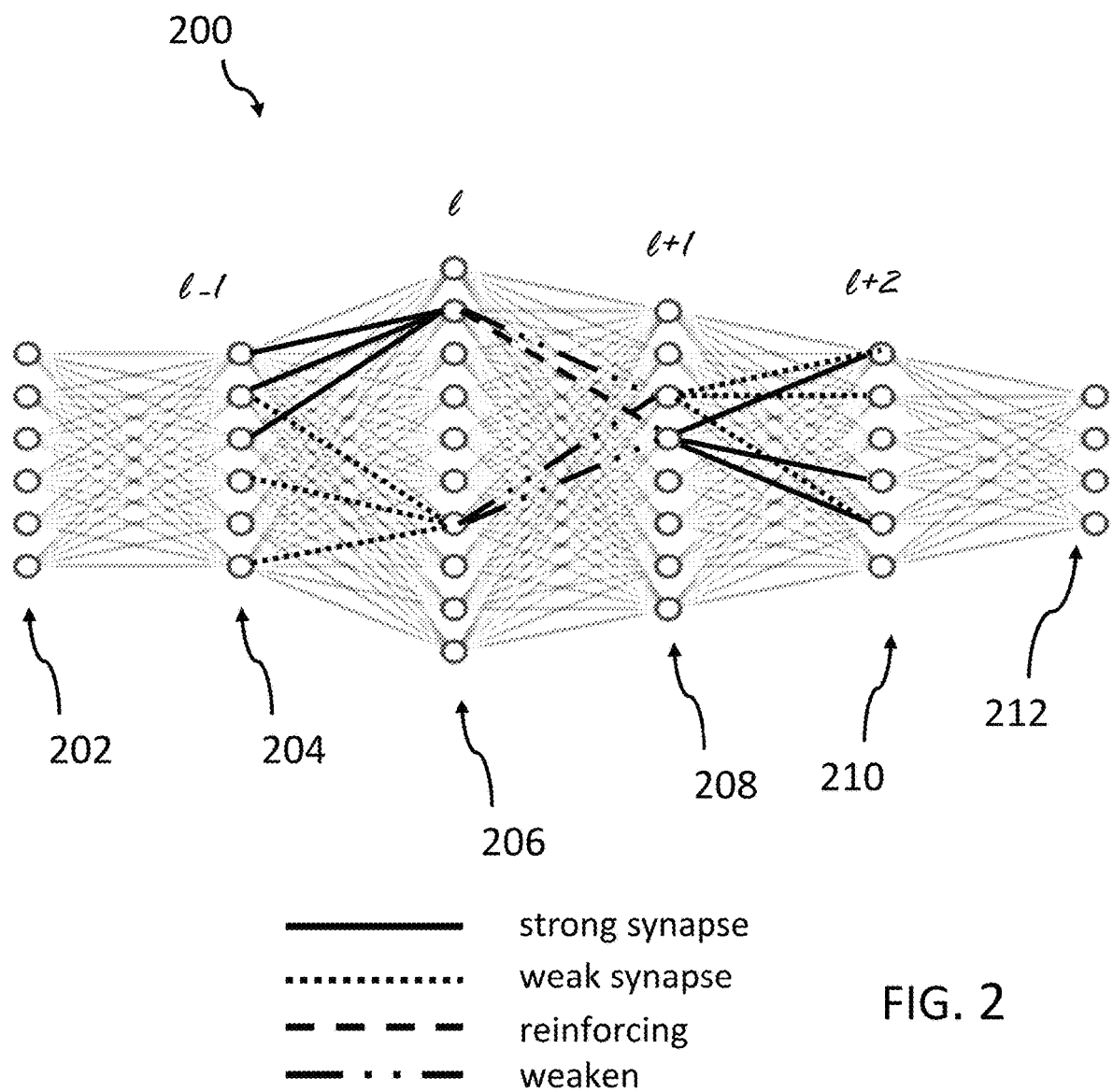

FIG. 2 shows a block diagram of an embodiment of a neural network with a plurality of layers.

Figure 3:
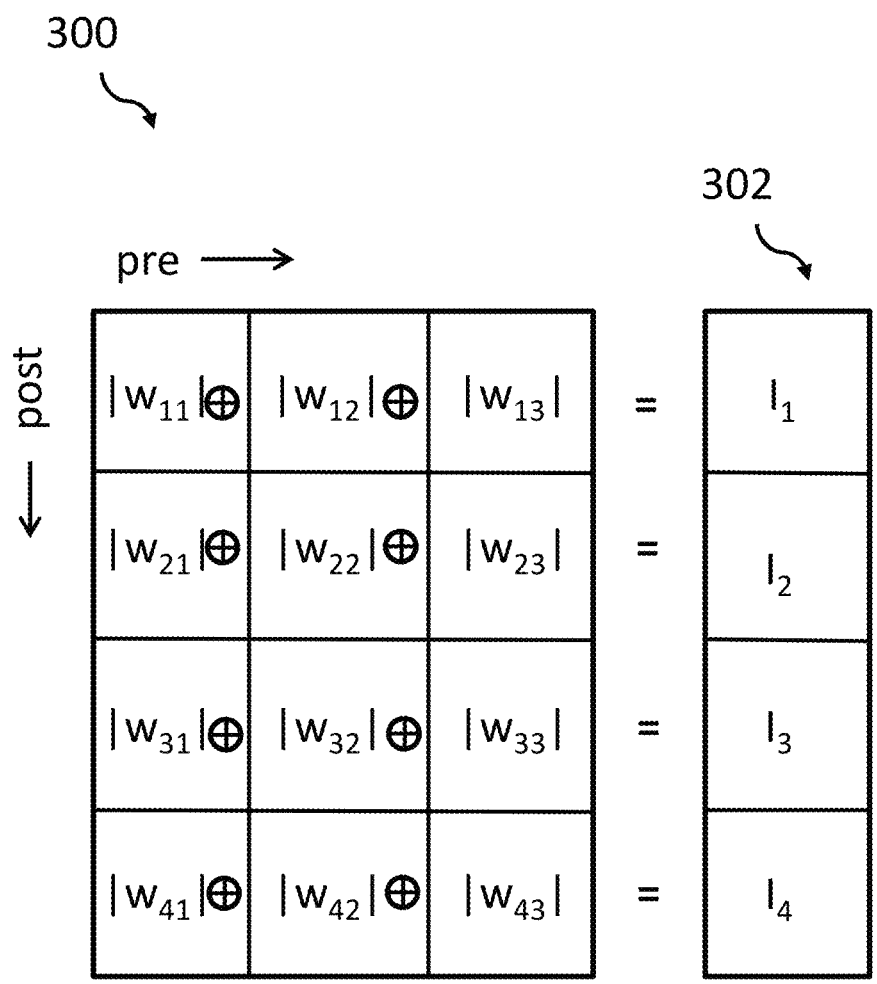

FIG. 3 shows an embodiment of a matrix instrumental for deriving the importance value of a specific node.

Figure 4:
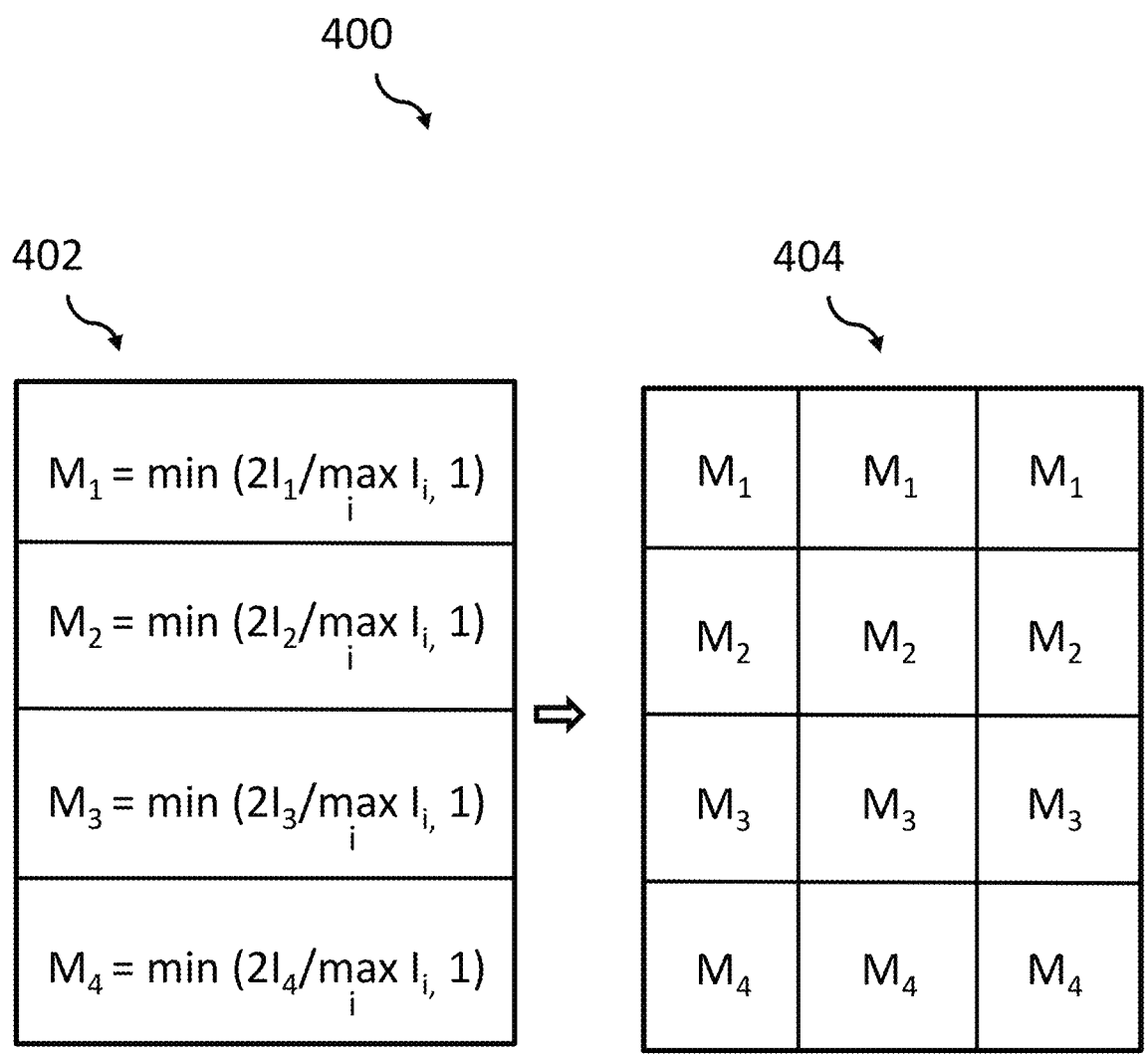

FIG. 4 shows an update value determination which is also shown as a matrix which is instrumental for the next step of determining the weight update.

Figure 5:
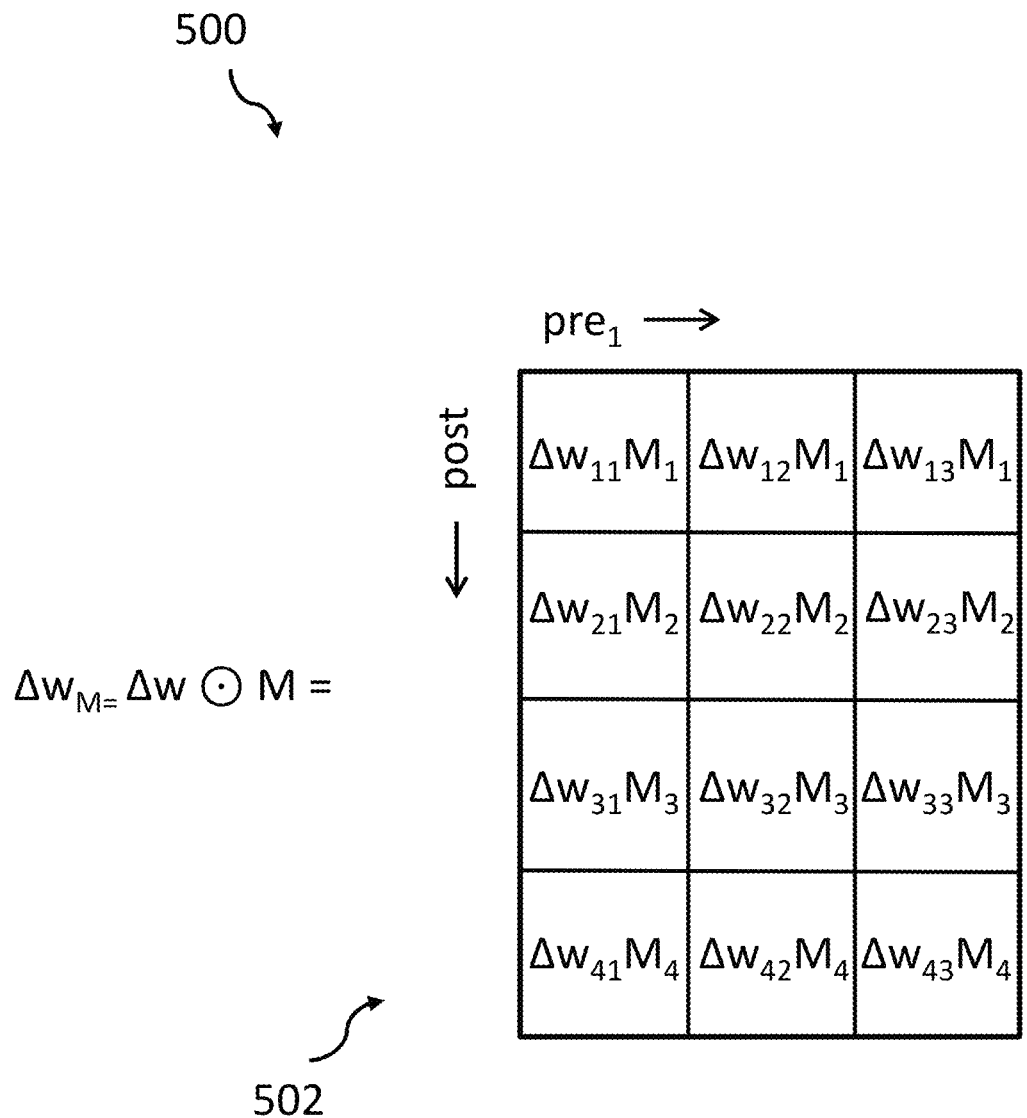

FIG. 5 shows the step of the weight update determination based on the importance of a specific node of the local embodiment.

Figure 6:
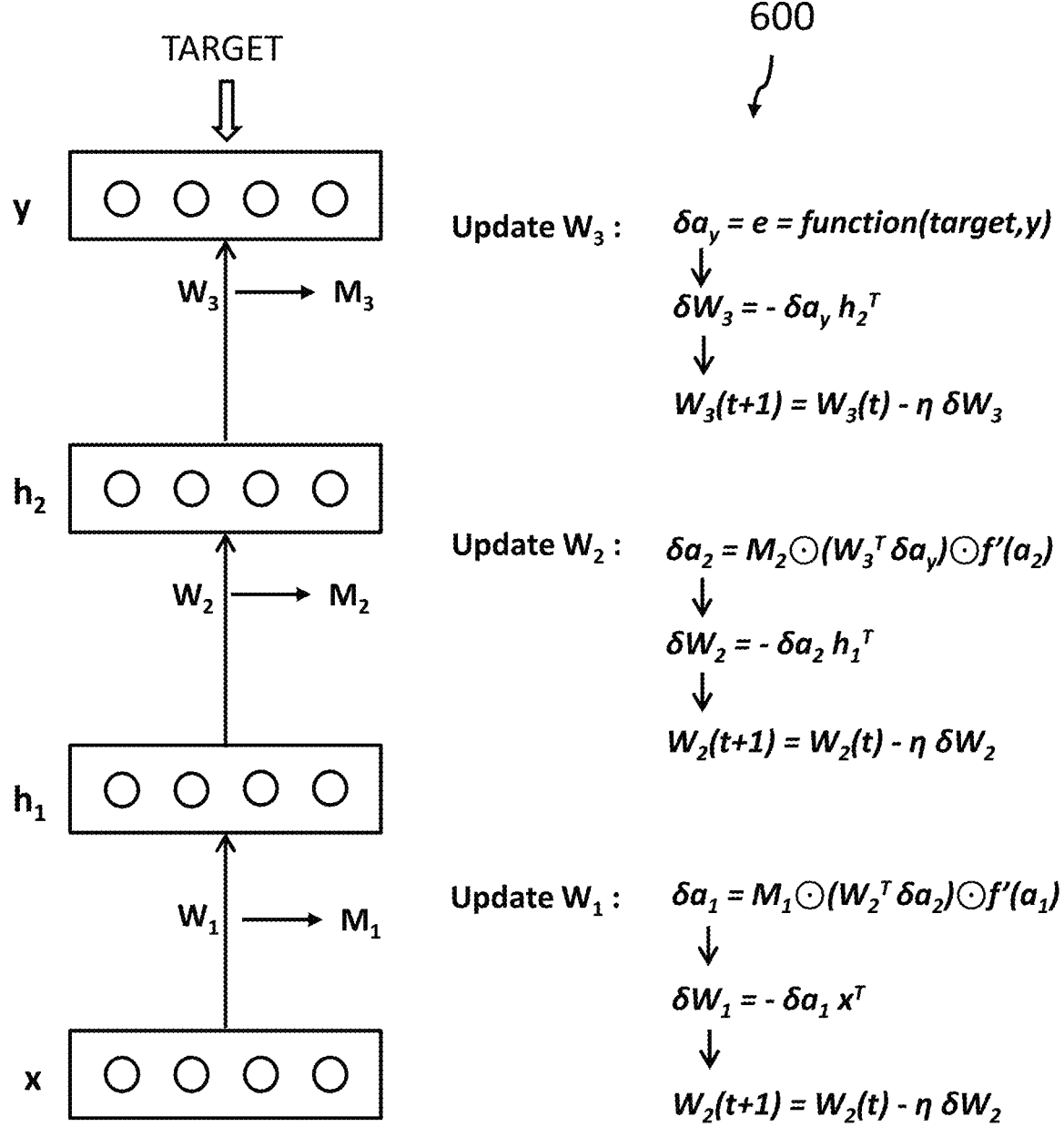

FIG. 6 shows the update mechanism for the weight value for the non-local embodiment.

Figure 7:
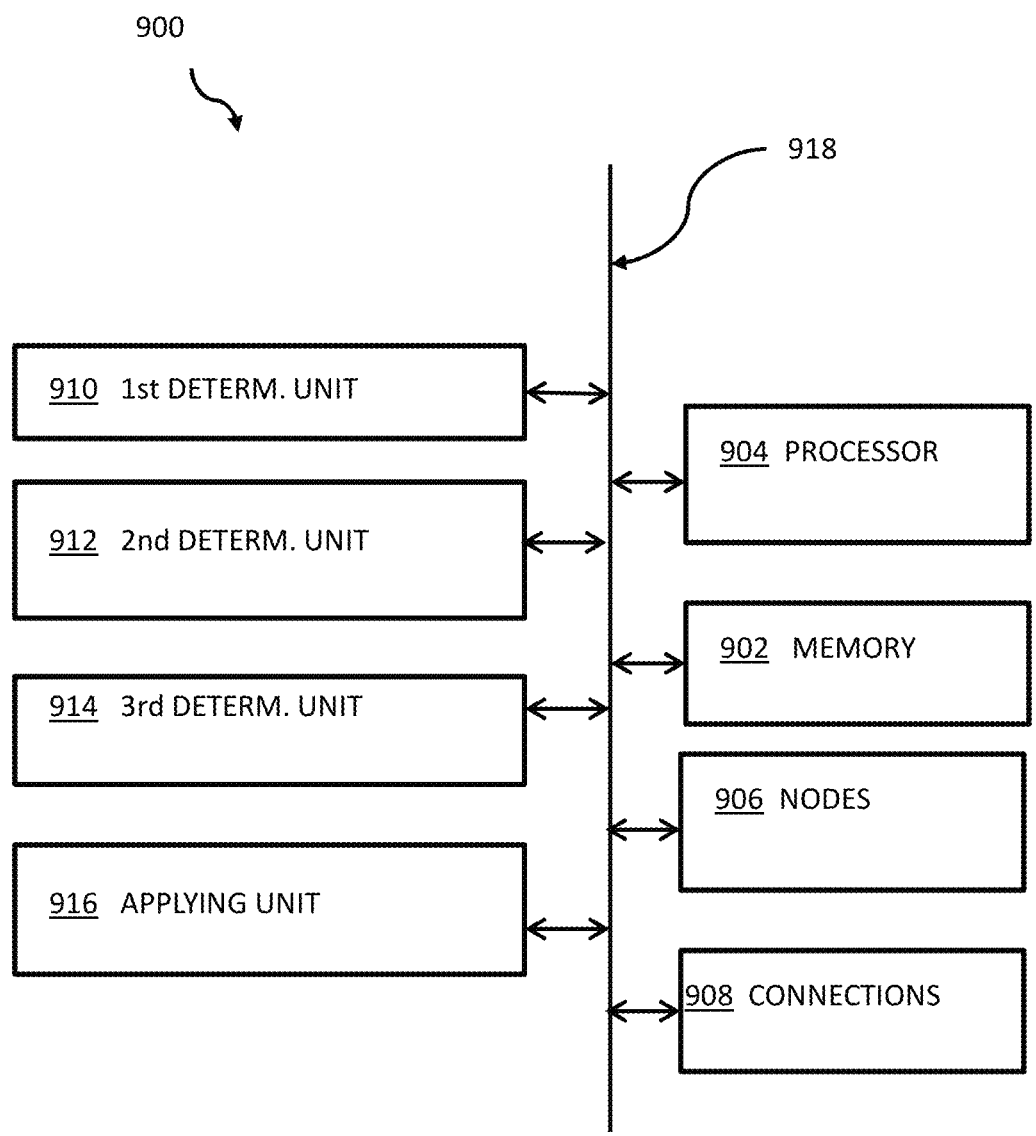

FIG. 7 shows the inventive neural network training system.

Figure 8:
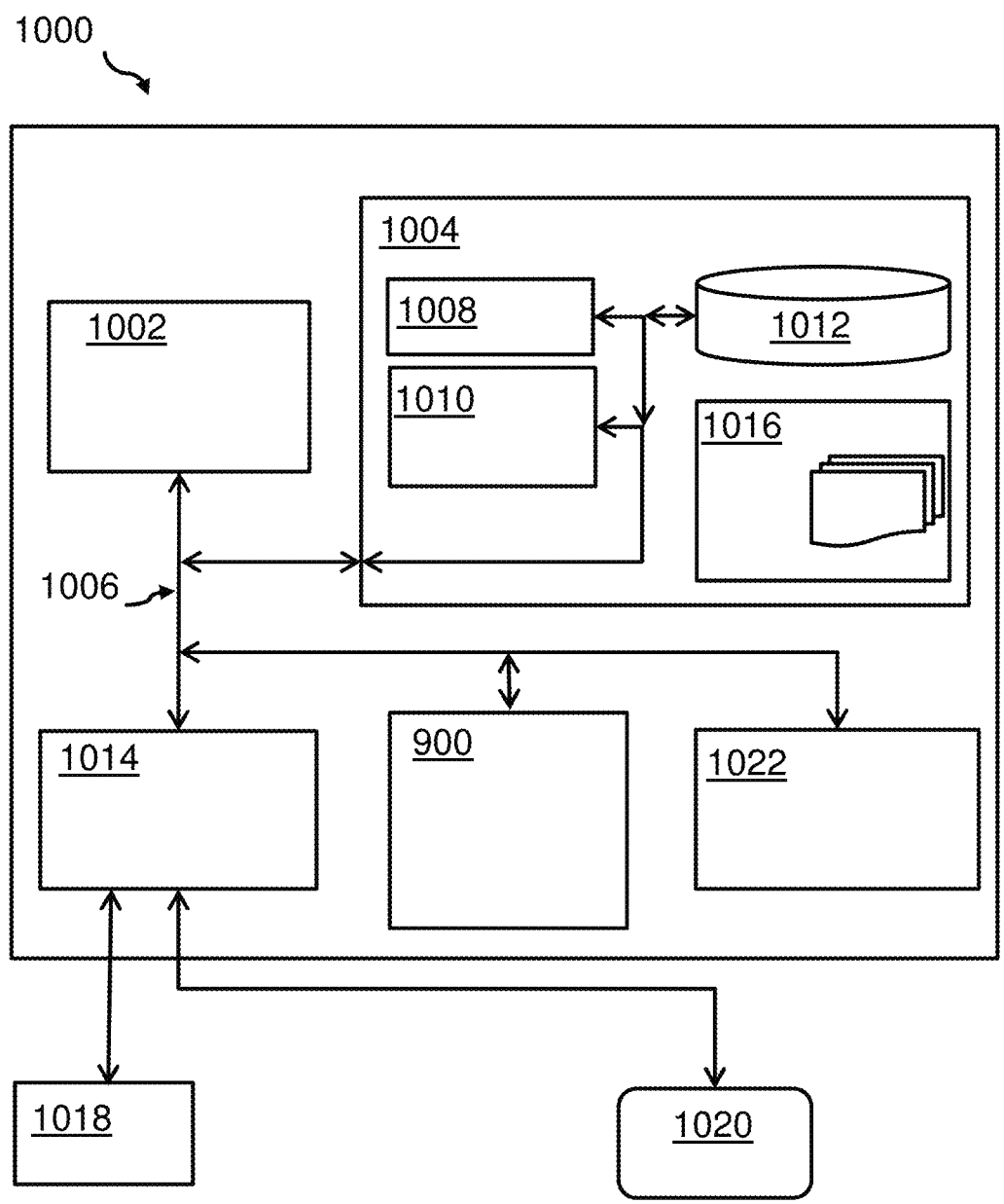

FIG. 8 shows a computing system with an integrated inventive neural network training system according to FIG. 7.

DETAILED DESCRIPTION

Training a neural network that comprises nodes and weighted connections between selected ones of the nodes is described herein. A function of a desired activity and a current activity during training results in a feedback signal used for adjusting weight values of the connections. For a weight value update cycle the process determines an importance value for various nodes based on current weight values of the connections and determines an adjustment of the feedback signal specific for each weight value of the connections by a combination of a gradient value derived from the feedback signal for a connection and the determined corresponding element of the adjustment matrix. The updates are applied to the connections during update cycles.

Some embodiments of the present invention recognize that the disadvantages of requiring storing the accumulated intermediate values in memory remain unresolved in the prior art. Hence, there is a need to overcome the currently known limitations of training a deep neural network, thereby decreasing training times as well as the required amount of memory and increasing inference accuracy.

In the context of this description, the conventions, terms and/or expressions that follow may be used.

The term "neural network" (NN) may denote a brain inspired network of nodes and connections between the nodes which may be trained for inference in contrast to procedural programming. The nodes may be organized in layers and the connections may carry weight values expressing a selective strength of a relationship between selected ones of the nodes. The weight values define the parameters of the neural network. The neural network may be trained with sample data for, e.g., for a classification of data received at an input layer of the neural network, wherein the classification results together with a confidence values can be made available at an output layer of the neural network. A neural network comprising a plurality of hidden layers (in addition to the input layer and the output layer) is typically denoted as deep neural network (DNN).

The term "node" may denote a compute node representing a compute function (e.g., ReLU) whose output value may be dependent on a plurality of incoming signals via a plurality of connections from an upstream layer of nodes in a neural network.

The term "weighted connection" may denote links or edges between nodes in the neural network. The strength of a link between nodes in different adjacent layers may be expressed by the weight value of the connection.

The term "feedback signal" may denote a signal derived from a current output of the neural network and an expected output, sometimes simply the difference between the two values. The feedback signal may also be a more complex function and be a function of the actual output and the target output. It may be used to further adapt the weight values of the neural network by, e.g., backpropagation.

The term "Hadamard product" denotes a special mathematical product of two matrices of equal dimensions and may produce another matrix of the same dimension as the operands, where each element i, j is the product of elements i, j of the original two matrices.

The term "weight value" may express a strength value of a connection between two nodes in the neural network. The weight value of a connection may be signed and may be defined to be excitatory, if positive, or inhibitory, if negative. A connection may be strong if the absolute value of the weight is comparably big, or may be weak otherwise.

The term "update cycle" may denote a period after which the weight values—sometimes denoted as parameters—of the neural network may be updated. This may be—in a simple case—done after a single training sample or a plurality of training samples. The period may be adaptable and/or configurable and may be self-optimized depending on the learning efforts of the neural network. The update of the weight values may be done after, e.g., 32 or 64 training samples; it may depend on the total number of training samples and an algorithm changing the update cycle period during the course of the training or may depend on an exceeded threshold value. If the weight update may be performed after a group of training samples, called "mini-batch", the adjustment may be performed for each sample, the adjusted gradient is cumulated at each sample, and after the last sample the weights are updated.

The term "importance value" may denote a numerical value assigned to a selected node in a selected layer of the neural network. In one embodiment, it may be derivable as the sum of all weight values—or, e.g., its absolute (math. sense) values—of incoming connections to the selected node. In an alternative embodiment, it may be the sum of weight values of all outgoing connection of the node. In general, the higher the sum of the absolute weight values, the greater the importance. It may also be seen as a responsibility of a specific node for influencing a signal traveling from the input layer to the output layer through the NN.

The term "adjustment matrix" may denote a matrix of scalar values derived from the importance value and lying in the range of [1, 2]. It may also be seen as an importance value normalized to the given range.

The term "gradient value derived from the feedback signal" may denote a direction in a multi-dimensional space pointing vaguely into a direction of a minimum in the parameter space of a learning neural network. In general, the minimum may be reached—i.e., if a loss function may be optimized—the learning process may be finished.

The term "connections incoming to a node" may denote all connections ending at a node. The node may—in this case—be denoted as postsynaptic because it is positioned after the synapse represented by the connection.

The term "connections outgoing of a node" may denote—in contrast to the incoming connections—all connections "leaving" a selected node. Such a node may be denoted as presynaptic because the node is positioned in the NN before the synapse, i.e., the connections.

The term "upstream layers" may denote—see from a selected layer—as those being positioned closer to the input layer of the NN.

The term "backpropagation" (BP) may denote the widely used algorithm in training feedforward neural networks for supervised learning. In fitting—i.e., training—the neural network, the backpropagation method determines the gradient of the loss function with respect to weight values of the NN for a single (or a plurality) of input-output training data. Exemplary, gradient descent of variants thereof such as stochastic gradient descent (SGD) shall be named here. In general, the back propagation algorithm may work by determining the gradient of the loss function with respect to each weight by the chain rule, determining the gradient one layer at a time, iterating backwards from the last NN layer to avoid redundant calculations of intermediate terms in the chain rule.

The term "direct feedback alignment" (DFA) may also denote a form of error propagation for training a neural network. It has been discovered that the weight values used for propagating the error of the output—if compared to the desired output—backwards do not have to be symmetric with the weight values used for propagation the activation forward. In fact, random feedback weights work evenly well, because the network learns how to make the feedback useful. The feedback alignment principle can be used for training at the layers more independently from the rest of the network, and from a zero initial condition. Thereby, the errors propagated through fixed random feedback may link directly from the output layer to each hidden layer. This simple method may be able to the reach nearly zero training error even in convolutional networks and very deep networks, completely without error backpropagation The term "feedback alignment" (FA) may be seen as a simpler form of the DFA because in FA the access to the layers for weight value updates may be done step by step in an upstream direction of the NN.

The term "indirect feedback alignment" (IFA) may denote another form of updating the weight values of the connections between the nodes of a NN. Here, the error may be propagated from the output layer to the first hidden layer and the weight values of a connection layer may be updated here, which then can influence the next downstream layer.

The term "stochastic gradient descent method" (SGD) may denote the known iterative method for optimizing an objective function with suitable smoothness properties. It may therefore be regarded as a stochastic approximation of gradient descent optimization, because it may replace the actual gradient (calculated from the entire data set) by an estimate made thereof (calculated from a randomly selected subset of the data).

The term "Adam optimizer method" may denote the known extension to stochastic gradient descent often being used in computer vision and natural language processing. The method may be used to replace the classical SGD method and iteratively update weight values of the network. It may deliver a fast convergence rate. Whereas the SGD method maintains a single learning rate for all weight updates and during the complete training, the Adam method may determine individual adaptive learning rates for different parameters—weight values—from estimates of first and second moments of the gradients.

The term "Nesterov Accelerated Gradient" (NAG) may denote the known modified SGD method named after its inventor. The NAG method comprises a gradient descent step for the momentum-like terms which are not the same as those used in classical momentum. This algorithm is known to converge faster and be more efficient than the classical SGD method.

The term "RMSprop" may also denote a gradient-based optimization technique used for training of neural networks. Gradients of very complex functions like neural networks may have a tendency to either vanish or explode as the data propagates through the function. RMSprop has been developed as a stochastic technique for mini-batch learning. It may use a moving average of squared gradients to normalize the gradient. This normalization balances the step size (momentum), decreasing the step for large gradients to avoid exploding, and increasing the step for small gradients to avoid vanishing.

In the following, a detailed description of the figures will be given. All instructions in the figures are schematic. Firstly, a block diagram of an embodiment of the inventive computer-implemented method for a training of a neural network. Afterwards, further embodiments, as well as embodiments of the neural network training system, will be described.

FIG. 1 shows a block diagram of a preferred embodiment of the method 100 for a training—in particular, for a training of the parameters/the weight values of the connections/edges—of the neural network. The neural network comprises nodes and weighted connections between selected ones of the nodes. Typically, the here proposed concept relates to a deep neural network comprising a plurality of hidden layers. It is not required that each node of a layer is connected to an adjacent layer (i.e., upstream or downstream). This may easily be implemented by setting their related weight value to zero with a chosen probability at each input presentation (in other words, "drop connect").

The method 100 comprises determining, 102, an importance value—e.g., $I_1, I_2, \ldots, I_n$, representing a responsibility for the influence of the signal traveling downstream through the neural network—for each node based on current weight values of the connections. In particular, connections of the specific node are meant. Node positions may be presynaptic—i.e., outgoing connections—or postsynaptic—i.e. incoming connections to a node.

The method 100 comprises also determining, 104, an adjustment—i.e. modulation—matrix comprising values dependent on the determined importance values. This is explained in more detail below.

Furthermore, the method 100 comprises determining, 106, a local updated value specific for each weight value of the connections by a combination—in particular the Hadamard product—of a gradient value derived from the feedback signal for a connection and the determined corresponding element of the adjustment matrix, and applying, 108, the updates to the connections during every update cycle.

Thereby, the term update cycle does not necessarily present a cycle after each training sample. Instead, one or more training sample can be seen as a group of training samples after which an update cycle is carried out, e.g., every 32 or 64 training samples. The updates are thereby accumulated, but the weight values are effectively changed only after (i) some time or, (ii) the adjustment crosses a given threshold. The easy way out is to say that the proposed method can determine the adjustments, and that the updates are a function of the adjustments, and some freedom is given when the updates are applied.

FIG. 2 shows a block diagram of an embodiment of a neural network 200 with a plurality of layers 202, 204, 206, 208, 210, 212. However, a real or practically used deep neural network may have a much larger number of nodes and layers. In this example, the layer 204 represents an upstream layer l−1, to the node layer l 206. Downstream to layer l 206 are the layer l+1 208 and the layer l+2 210. Layer 212 represents the output layer of the neural network 200, wherein the layer 202 of the nodes—all symbolized by circles—represents the input layer of the neural network.

Additionally, different types of connections between the nodes are shown. Strong connections, i.e., strong synapses, having comparably high weight values are represented by a bold continuous line. A weak synapse may be represented by a dashed line. A reinforcing connection may be represented by another type of dashed line. Finally, a weakening connection between two nodes of different layers may be represented by a dashed line having short and long partial lines. In general, the upstream direction in the neural network 200 is from the right side to the left side. Consequently, the downstream direction in the neural network 200 is from the left side (from the input side) to the output layer 212 (i.e., right side).

FIG. 3 shows an embodiment of a matrix 300 instrumental for deriving the importance value of a specific node. Thereby, the importance or importance value can be understood as the average responsibility of a node on the propagation of the input signal to the neural network and thus, on the final error, based on the current weight value distribution. Hence, the weight values $w_{j,i}$ (j corresponding to "post"; i corresponding to "pre"). The vector 302 represents the importance values of the nodes of a specific layer in the neural network. In the shown example, in particular, the importance (importance values) of postsynaptic nodes are built by adding the incoming weight value to a specific node i, in absolute terms. Hence, the importance value of node i is $I_i$. Therefore, the first component of the vector 302 is the importance value of the first (topmost) node of the respective layer of nodes in the neural network.

FIG. 4 shows an update value determination 400 which is also shown as a matrix which is instrumental for the next step of determining the weight update. The weight update factor determination is shown as vector 402. It shows the manipulation of the importance vector in order to obtain the local update factor values (also denoted as local modulation factor, i.e., "M") with an amount limited to the range [1, 2]. The local update factor value is repeated as many times as the layer size to obtain the local update matrix 404. As an example, the top left value $M_1$ represents the first local upgrade value for all connections being positioned incoming to the first node (i.e., for a the first postsynaptic node).

FIG. 5 shows the step of the weight update determination 500 based on the importance of a specific node for the "local" embodiment. Based on the preparatory steps, described in FIG. 3 and FIG. 4, the updated weight value for the here shown example of four nodes in a layer can now be determined by the Hadamard product, i.e., by multiplying the gradient Δw determined through the chosen learning rule by the local update matrix to modulate or influence the weight value update, resulting in matrix 502.

Because of the higher complexity of the weight updates in case of the non-local embodiment in contrast to the local embodiment, FIG. 6 shows a diagram 600 for formulas used for the non-local embodiment of updates of the weight values. Thereby, the determination of the importance factors and the determination of the local update values—or modulation factor values—are the same if compared to the local version of the figure before. In a third step, the feedback signal is adjusted through the local-update/modulation factor in the non-local version of the here proposed concept. The diagram of FIG. 6 shows how the adjustment in the propagating version is applied in a two hidden-layer neural network trained with BP. Thereby, the following symbols are used:

$W_1$, $W_2$, $W_3$ are the feedforward weights, x, $h_1$, $h_2$, y are the activities of the layers, $M_1$, $M_2$, $M_3$ are the modulation matrices per layer, f is the activation function, f' is the derivative of the activation function, $\_^T$ denotes the transpose of a vector or matrix, t is the time step, η is the learning rate, and ⊙ denotes the Hadamard product.

It may also be noted that "x" represents the input layer, whereas "target" represents the target, i.e., the desired output of the neural network. The nodes in the different layers are symbolized by circles, wherein the number of circles/nodes (actually four per layer) is only a symbolic representation. The layers of nodes may have uniform size or a different number of nodes per layer.

Simulation results based on MNIST database (the known Modified National Institute of Standards and Technology comprising handwritten data samples) for an embodiment of the proposed concept demonstrate that much fewer training epochs are required relative to the classical SGD process in order to achieve the same accuracy. The same was found to be true when the MNIST database is replaced with the Fashion MNIST database.

The simulation set up was as follows: as already mentioned, the MNIST and the Fashion MNIST database have been used. As training algorithm, backpropagation was used and the determination of the update adjustment values, i.e. the modulation value, was grouped by post-synaptic nodes and propagated upstream. The training/validation ratio split was 90:10. As activation function for the nodes ReLU was used in a NN with 10 layers and 256 neurons/nodes per layer. The dropout rate was 0.1. The results shown are the average over three simulation runs.

As one can see easily, the proposed modulation/update value concept shows a faster convergence rate during training and higher classification accuracy during testing. Therefore, a baseline algorithm was used with constant learning rate equal to the mean learning rate of the modulated SGD (in form of a postsynaptic importance factor determination) at the beginning of the training.

If one compares the testing accuracy for the MNIST and the Fashion MNIST databases, one gets the results shown in Table 1, below.

TABLE 1

Comparison Results.

| | MNIST | Fashion MNIST |
|---|---|---|
| classical SGD | 96.8 +/− 0.1 | 86.6 +/− 0.1 |
| modulated SGD | 98.3 +/− 0.1 | 88.5 +/− 0.1 |

Thus, a significant difference exists between classical SGD and modulated SGD.

Significant differences can be shown between the classical and the modulated SGD for alternative embodiments of the proposed concept. The modulation of SGD can be applied to different training algorithms that rely on SGD, such as: (i) backpropagation, (ii) Feedback Alignment (FA) and its variants Direct Feedback Alignment (DFA) and Indirect Feedback Alignment (IFA).

The setup of the preliminary results has been: as data sets have been used the extended MNIST database (for DFA) and MNIST (for FA). The training algorithms have been DFA and FA. The update of the modulation value was determined by grouping pre-(DFA) or post (FA) and propagated upstream (both). Also here, the training/validation split was 90:10. As activation function ReLU (for DFA) and tanh (for FA) was used. The neural network was composed of three hidden layers with 256 nodes each. There was no dropout and the results are the average over five simulation runs. The accuracy can increase significantly compared to classical SGD training and SGD validation.

Table 2 shows training data with DFA on the extended MNIST database as well as training and validation with FA on the MNIST database. The results in Table 2 have been measured:

TABLE 2

Measured Results.

| | DFA extended MNIST | FA MNIST |
|---|---|---|
| classical SGD | 66.3 +/− 0.2 | 97.4 +/− 0.1 |
| modulated SGD | 71.0 +/− 0.4 | 97.7 +/− 0.1 |

Thus, also here, a significant difference exists between the classical and modulated SGD, the newly proposed approach.

The proposed computer-implemented method for a training of a neural network may offer multiple advantages, technical effects, contributions and/or improvements including: (i) in contrast to the existing modifications of classical SGD which have been introduced to improve the convergence rate for the weight values of the connections in a neural network during training, the here proposed concept does not require manual tuning of hyperparameters or additional memory to store intermediate values used in weight update calculations; (ii) the proposed concept may modulate or influence or update the weight value updates based on the internal dynamics of the neural network in a way that can be achieved by directly modulating the learning rate of certain parameters in an inhomogeneous way so, effectively, the proposed concept may enable training in fewer training cycles and may also require less memory with respect to momentum-based methods. Additionally, the proposed concept may allow for higher classification accuracy during testing; (iii) the method may also be dynamically adapted to different data sets and architectures of the neural network regardless of the depth of the NN, hidden layer sizes, as well as used activation functions; (iv) unlike other SGD modifications, such as momentum-based optimizers, the proposed SGD modulation does not need to store accumulated gradients from previous training steps with additional memory costs for use in modern concepts like neuromorphic and bio-inspired algorithms and AI chips; (v) the accuracy of inference results may be increased, and/or the number of training epochs to reach a target accuracy may be decreased.

The proposed computer-implemented method for a training of a neural network may offer multiple advantages, technical effects, contributions and/or improvements including: (i) it may be mentioned that the modulation may help improving the performance of the trained model when the model complexity increases and classical SGD fails in exploiting it; (ii) the determination of the importance value per node may comprise building a sum of weight values of connections incoming to a node and the weight values used to build the sum may be the absolute values (without a sign); (iii) this postsynaptic determination of the importance may deliver better results for the training of the neural network than the presynaptic determination of the importance (this terminology reflects that the connections, links or edges in a neural network represent synapses taking mammal brains as the fundamental inspiration for the underlying mechanism); (iv) the determination of the importance value per node may comprise determining the sum of weight values of connections outgoing of or from a node, which may be described as presynaptic because the connection leaves—i.e., goes out of a respective node and the absolute weight values may be used; and/or (v) the adjustment value specific for each weight value of the connections in one layer of connections is also influencing at least one of upstream layers of connections in the neural network (this is not the "updated value" which influences also the upstream layers, but rather an "adjustment value" in particular from an adjustment matrix, which may be used to compute the updated value) (embodiments of this kind may also be denoted as "non-local").

The proposed computer-implemented method for a training of a neural network may offer multiple advantages, technical effects, contributions and/or improvements including the updated value specific for each weight value of the connections in one layer of connections is neutral—i.e., not affecting—for all upstream layers of connections in the neural network. I.e., it may not impact the feedback signal which gets updated by the adjustment matrix. In contrast to the "non-local" version, this embodiment may be denoted as "local". Hence, and in other words, in the local version embodiment of the proposed concept, the weight update for the connections from each presynaptic node pre in layer l−1 to postsynaptic node a in layer l obtained by applying the modulation may be expressed as:

$$w_{post=a,pre}^{t+1} = w_{post=a,pre}^{t} - \eta M_{a,l}^{t} \Delta w_{post=a,pre}^{t},$$

wherein $\eta$ is the learning rate and $M_{a,l}^{t}$ is the adjustment factor for all connections to postsynaptic node a in layer l.

The proposed computer-implemented method for a training of a neural network may offer multiple advantages, technical effects, contributions and/or improvements including: (i) the feedback signal may be based on one selected out of the group comprising backpropagation (BP), feedback alignment (FA)—in particular also its variants , e.g., direct feedback alignment (DFA) and indirect feedback alignment (IFA). Hence, the proposed concept may work well with the typical feedback signals for neural networks often used these days; and/or (ii) the updating of the weight values of connections specific for each node in each layer may comprise multiplying the gradient value derived from the feedback signal with an adjustment factor, in particular an adjustment factor value. This may work for the local and non-local version with an adjustment factor.

The proposed computer-implemented method for a training of a neural network may offer multiple advantages, technical effects, contributions and/or improvements including where there is a post-synaptic determination, the importance value $I_{a,l}^t$ for each node a in layer l of the neural network at time step t is a sum of the absolute strength of all weight values $w_{post=a,pre}^{l,t}$ of layer l whose postsynaptic neuron is a. This may also be expressed as a formula:

$$I_{a,l}^t = \sum_{pre=1}^{N_{pre}} |w_{post=a,pre}^{l,t}|$$

wherein:
t is the current time step,
a is the node of which we are computing the importance,
l is the layer to which node a belongs,
pre is the index of presynaptic nodes, running from 1 to Npre, Npre being the total number of nodes in the presynaptic layer (l–1) and thus being the total number of connections connected to node a, and
$w_{post=a,pre}^{l,t}$ is the weight connecting a node pre in layer l–1 (pre) to the node a in layer l (post=a), at time step t.

The proposed computer-implemented method for a training of a neural network may offer multiple advantages, technical effects, contributions and/or improvements including the importance value $l_{a,l}^t$ for each node a in layer l of the neural network at time step t may be a sum of the absolute strength of all weight values $w_{post,pre=a}^{l,t}$ of layer l+1 whose presynaptic neuron is a; and/or (ii) a local modulation factor value $M_{a,l}^t$ of the adjustment matrix—i.e., values of the adjustment matrix—may be determined for a node a in layer l at time step t as ratio between the importance value $l_{a,l}^t$ of the node a and the maximum importance among all postsynaptic neurons in layer l, multiplied by two, and lower bounded by 1. Expressed as formula:

$$M_{a,l}^t = \min\left(2\frac{I_{a,l}^t}{\max_{post} I_{post,l}^t}, 1\right) \in [1, 2].$$

wherein:
$l_{a,l}^t$ is the importance $i_{a,l}^t$ of a node a in layer l of the neural network at time step t, and
$l_{post,l}^t$ is the importance $l_{post,l}^t$ of a node post in layer l of the neural network at time step t.

The proposed computer-implemented method for a training of a neural network may offer multiple advantages, technical effects, contributions and/or improvements including: (i) involving the non-local update—the method may also comprise directly applying the adjustment factor value $M_{a,l}^t$ to determine $\Delta w_{post=a,pre}^t$, wherein $w_{post=a,pre}^{l,t}$ is the weight value connecting a node pre in layer l–1 (pre) to the node a in layer l (post=a), at time step t; and/or (ii) for the training, one method may be used which can be selected out of the group comprising stochastic gradient descent method, Adam optimizer method, Nesterov Accelerated Gradient, and RMSprop. This makes the here proposed concept basically independent from the used optimizers. Other optimizers may also be used successfully.

For completeness reasons, FIG. 7 shows an embodiment of the inventive neural network training system 900 for training of a neural network. The neural network comprises nodes 906 and weighted connections 908 between selected ones of the nodes 906, wherein a function of a desired activity and a current activity during training results in a feedback signal used for adjusting weight values of the connections. The system 900 comprises also a memory 902 and a processor 904. Thereby, the memory 902 stores program code portions for enabling the processor for every update cycle to determine—e.g., by a first determination unit 910—an importance value for each node based on current weight values of the connections, and determine—e.g., by a second determination unit 912—an adjustment matrix comprising values dependent on the determined importance values.

Furthermore, the stored program code portions enable the processor 904 also to determine—e.g., by a third determination unit—a local updated value specific for each weight value of the connections by a combination of a gradient value derived from the feedback signal for a connection and the determined corresponding element of the adjustment matrix, and apply—e.g. by an applying unit 912—the updates to the connections during every update cycle.

Hereby, it should be considered that all elements of the neural network training system 900—in particular all modules and units as well as the memory 902 and the processor 904—have the implementation option to be realized in hardware. In that case, the units and modules are electrically connected for data and signal exchange. In particular, there may be a specific memory for the nodes 906 as well as for the connections 908.

According to the just mentioned implementation option, in particular the first determination unit 910, the second determination unit 912, the third determination unit 914 and the applying unit 916 may be realized completely in hardware or in a combination of software and hardware elements. All active and passive units, modules and components of the system 900 may either exchange signals and data directly between each other or may make use of a system 900 internal bus system 918.

Embodiments of the invention may be implemented together with virtually any type of computer, regardless of the platform being suitable for storing and/or executing program code. FIG. 8 shows, as an example, a computing system 1000 suitable for executing program code related to the proposed method.

The computing system 1000 is only one example of a suitable computer system, and is not intended to suggest any limitation as to the scope of use or functionality of embodiments of the invention described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the invention.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the invention, as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of the computer system/server 1000 via bus 1006. It should be understood that, although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

Additionally, the neural network training system 900 may be attached to the bus system 1006.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept can be summarized by the paragraphs that follow.

A method for a training of a neural network, the neural network comprising nodes and weighted connections between selected ones of the nodes, wherein a function of a desired activity and a current activity during training results in a feedback signal which is used for adjusting weight values of the connections, the method comprising for every weight value update cycle includes: determining an importance value for each node based on current weight values of the connections, determining an adjustment matrix comprising values dependent on the determined importance values, determining a local updated value specific for each weight value of the connections by a combination of a gradient value derived from the feedback signal for a connection and the determined corresponding element of the adjustment matrix, and applying the updates to the connections during every update cycle.

The method wherein the determination of the importance value per node comprises building a sum of weight values of connections incoming to a node.

The method wherein the determination of the importance value per node comprises determining the sum of weight values of connections outgoing of a node.

The method wherein the importance value $l_{a,l}^{t}$ for each node a in layer l of the neural network at time step t is a sum of the absolute strength of all weight values $w_{post=a,pre}^{l,t}$ of layer l whose postsynaptic neuron is a.

The method wherein the importance value $l_{a,l}^{t}$ for each node a in layer l of the neural network at time step t is a sum of the absolute strength of all weight values $w_{post,pre=a}^{l+1,t}$ of layer l+1 whose presynaptic neuron is a.

The method wherein a local update value $M_{a,l}^{t}$ of the adjustment matrix is determined for a node a in layer l at time step t as ratio between the importance value $l_{a,l}^{t}$ of the node a and the maximum importance among all neurons in layer l, multiplied by two, and lower bounded by 1.

The method wherein the local update value $M_{a,l}^{t}$ specific for each weight value of the connections in one layer of connections is also influencing at least one of upstream layers of connections in the neural network.

The method according to any of the preceding clauses, wherein the update value $M_{a,l}^{t}$ specific for each weight value of the connections in one layer of connections is neutral for all upstream layers of connections in the neural network.

The method according to any of the preceding clauses, wherein the updating of the weight values of connections specific for each node in each layer comprises multiplying the gradient value derived from the feedback signal with an adjustment factor value $M_{a,l}^{t}$.

The method according to any of the clauses 4 to 9, also comprising directly applying the local update value $M_{a,l}^{t}$ to determine $\Delta w_{post=a,pre}^{t}$, wherein $w_{post=a,pre}^{l,t}$ is the weight value connecting a node pre in layer l-1 (pre) to the node a in layer l (post=a), at time step t.

The method according to any of the preceding clauses, wherein the feedback signal is based on one selected out of the group comprising backpropagation, feedback alignment, direct feedback alignment and indirect feedback alignment.

The method according to any of the preceding clauses, wherein for the training one method is used selected out of the group comprising a stochastic gradient descent method, Adam optimizer method, Nesterov Accelerated Gradient, and RMSprop.

A neural network training system for a training of a neural network, the neural network comprising nodes and weighted connections between selected ones of the nodes, wherein a function of a desired activity and a current activity during training results in a feedback signal which is used for adjusting weight values of the connections, the system comprising: a memory and a processor, wherein the memory stores program code portions for enabling the processor for every update cycle to: determine an importance value for each node based on current weight values of the connections; determine an adjustment matrix comprising values dependent on the determined importance values; determine an updated value specific for each weight value of the connections by a combination of a gradient value derived from the feedback signal for a connection and the determined corresponding element of the adjustment matrix; and apply the updates to the connections during every update cycle.

The system wherein during the determination of the importance value per node, the program code portions enable the processor also to building a sum of weight values of connections incoming to a node.

The system wherein during the determination the importance value per node, the program code portions enable the processor also to determining the sum of weight values of connections outgoing of a node.

The system wherein the importance value $l_{a,l}^{t}$ for each node a in layer l of the neural network at time step t is a sum of the absolute strength of all weight values $w_{post=a,pre}^{l,t}$ of layer l whose postsynaptic neuron is a.

The system wherein the importance value $l_{a,l}^{t}$ for each node a in layer l of the neural network at time step t is a sum of the absolute strength of all weight values $w_{post,pre=a}^{l+1,t}$ of layer l+1 whose presynaptic neuron is a.

The system wherein a local update factor value $M_{a,l}^{t}$ of the adjustment matrix is determined for a node a in layer l at time step t as ratio between the importance value $l_{a,l}^{t}$ of the node a and the maximum importance among all neurons in layer l, multiplied by two, and lower bounded by 1.

The method wherein the local update factor value $M_{a,l}^{t}$ specific for each weight value of the connections in one layer of connections is also influencing at least one of upstream layers of connections in the neural network.

The system wherein the local update factor value $M_{a,l}^{t}$ specific for each weight value of the connections in one layer of connections is neutral at least one of upstream layer of connections in the neural network.

The system wherein, during the updating the weight values of connections specific for each node in each layer, the program code portions enable the processor also to multiplying the gradient value derived from the feedback signal with an adjustment factor value $M_{a,l}^{t}$.

The system comprising directly applying the adjustment factor value $M_{a,l}^{t}$ to determine $\Delta w_{post=a,pre}^{t}$; wherein $w_{post=a,pre}^{l,t}$ is the weight value connecting a node pre in layer l-1 (pre) to the node a in layer l (post=a), at time step t.

The system wherein the feedback signal is based on one selected out of the group comprising backpropagation, feedback alignment, direct feedback alignment and indirect feedback alignment.

The system wherein for the training one method is used selected out of the group comprising stochastic gradient descent method, Adam optimizer method, Nesterov Accelerated Gradient, and RMS prop.

A computer program product for a training of a neural network, the neural network comprising nodes and weighted connections between selected ones of the nodes, wherein a function of a desired activity and a current activity during training results in a feedback signal which is used for adjusting weight values of the connections, the computer program product comprising a computer readable storage medium having program instructions embodied therewith, the program instructions being executable by one or more computing systems or controllers to cause the one or more computing systems to: determine, by the one or more computing systems, an importance value for each node based on current weight values of the connections; determine, by the one or more computing systems, an adjustment matrix comprising values dependent on the determined importance values; determine, by the one or more computing systems, an updated value specific for each weight value of the connections by a combination of a gradient value derived from the feedback signal for a connection and the determined corresponding element of the adjustment matrix, and apply, by the one or more computing systems, the updates to the connections during every update cycle.

What is claimed is:

1. A method for training a neural network, the method comprising:
receiving training data by the neural network at a first input layer;
for every update cycle, determining an importance value for each node of each layer in the neural network by adding an incoming weight value to the node as an absolute value;
for each node in each layer in the neural network, calculating values of an adjustment matrix as a ratio between the importance value of the node in the layer and a maximum importance among all postsynaptic neurons in the layer multiplied by two and lower bounded by one;
calculating a local update value of the adjustment matrix for each node in each layer of the neural network as a ratio between the importance value of the node in the layer and the maximum importance among all neurons in the layer multiplied by two and lower bounded by one;
for each node in each layer of the neural network, calculating a local update value by a combination of a gradient value derived from a feedback signal for each weighted connection and a corresponding element of the adjustment matrix, the feedback signal representing a function of a desired activity and a current activity of the first weighted connection during a first training cycle, and the gradient value being a direction in a multi-dimensional space pointing at least in part into a direction of a minimum in a parameter space of a learning neural network; and
propagating the local update values through the neural network to update the weighted connections including the first weighted connection according to the adjustment matrix including the first updated value.

2. The method according to claim 1, wherein determining the set of importance values includes:
building a sum of weight values for identified weighted connections incoming to the set of nodes.

3. The method according to claim 2, wherein the importance value $I_{a,l}^t$ for each node a in layer l of the neural network at time step t is a sum of the absolute strength of all weight values $w_{post=a,pre}^{l,t}$ of layer l having a postsynaptic neuron equal to a.

4. The method according to claim 1, wherein determining the importance values includes:
determining a sum of weight values of weighted connections outgoing from the set of nodes.

5. The method according to claim 4, wherein the importance value $I_{a,l}^t$ for each node a in layer l of the neural network at time step t is a sum of the absolute strength of all weight values $w_{post,pre=a}^{l+1,t}$ of layer l+1 having a presynaptic neuron equal to a.

6. The method according to claim 1, wherein:
a first update value $M_{a,l}^t$ of the adjustment matrix is determined for a node a in layer l at time step t as:

a ratio between an importance value $I_{a,l}^t$ of node a and a maximum importance value among all neurons in layer l;
the ratio multiplied by two to form a product; and
the product lower bounded by 1.

7. The method according to claim 6, wherein the first update value $M_{a,l}^t$ specific for each weight value of the weighted connections in one layer of weighted connections is also influencing at least one upstream layer of the weighted connections in the neural network.

8. The method according to claim 7, further comprising:
directly applying the first update value $M_{a,l}^t$ to determine $\Delta w_{post,pre}^{l,t}$;
wherein:
$w_{post,pre}^{l,t}$ is the weight value connecting a node pre in layer l-1 (pre) to the node post in layer l, at time step t.

9. The method according to claim 6, wherein the update value $M_{a,l}^t$ specific for each weight value of the weighted connections in one layer of weighted connections is neutral for all upstream layers of the weighted connections in the neural network.

10. The method according to claim 9, wherein adjusting the weight values of connections specific for each node in each layer includes:
multiplying the gradient value derived from the feedback signal with an adjustment factor value $M_{a,l}^t$.

11. The method according to claim 1, wherein the feedback signal is a member of the group consisting of:
a) backpropagation,
b) feedback alignment,
c) direct feedback alignment, and
d) indirect feedback alignment.

12. The method according to claim 1, wherein the training is performed by a method selected from the group consisting of:
a) stochastic gradient descent method,
b) Adam optimizer method,
c) Nesterov Accelerated Gradient method, and
d) RMSprop method.

13. A neural network training system for training a neural network, the neural network comprising nodes and weighted connections between selected ones of the nodes, wherein a function of a desired activity and a current activity during training results in a feedback signal which is used for adjusting weight values of the connections, the system comprising:
a memory; and
a processor;
wherein the memory stores program code portions for enabling the processor for every update cycle to:
receive training data by the neural network at a first input layer;
for every update cycle, determine an importance value for each node of each layer in the neural network by adding an income weight value to the node as an absolute value;
for each node in each layer in the neural network, calculate values of an adjustment matrix as a ratio between the importance value of the node in the layer and a maximum importance among all postsynaptic neurons in the layer multiplied by two and lower bounded by one;
calculate a local update value of the adjustment matrix for each node in each layer of the neural network as ratio between the importance value of the node in the layer and the maximum importance among all neurons in the layer multiplied by two and lower bounded by one;

for each node in each layer of the neural network, calculate a local update value by a combination of a gradient value derived from a feedback signal for each weighted connection and a corresponding element of the adjustment matrix, the feedback signal representing a function of a desired activity and a current activity of the each of the weighted connections during training, and the gradient value being a direction in a multi-dimensional space pointing at least in part to a direction of a minimum in a parameter space of a learning neural network; and propagate the local update values through the neural network to update each of the weighted connections during every update cycle.

14. The neural network training system according to claim 13, wherein for determining the importance value for each node, the program code portions further enable the processor to:

build a sum of weight values of connections incoming to a node.

15. The neural network training system according to claim 14, wherein the importance value $I_{a,l}^{t}$ for each node a in layer l of the neural network at time step t is a sum of the absolute strength of all weight values $w_{post=a,pre}^{l,t}$ of layer l having a postsynaptic neuron equal to a.

16. The neural network training system according to claim 13, wherein determining the importance value for each node includes:

determining a sum of weight values of connections outgoing of a node.

17. The neural network training system according to claim 16, wherein the importance value $I_{a,l}^{t}$ for each node a in layer l of the neural network at time step t is a sum of the absolute strength of all weight values $w_{post,pre=a}^{l+1,t}$ of layer l+1 having a presynaptic neuron equal to a.

18. The neural network training system according to claim 13, wherein:

a local update factor value $M_{a,l}^{t}$ of the adjustment matrix is determined for a node a in layer l at time step t as:
a ratio between the importance value $I_{a,l}^{t}$ of the node a and the maximum importance among all neurons in layer l,
the ratio multiplied by two to form a product; and
the product lower bounded by 1.

19. The neural network training system according to claim 18, wherein the local update factor value $M_{a,l}^{t}$ specific for each weight value of the connections in one layer of connections is also influencing at least one upstream layer of the connections in the neural network.

20. The neural network training system according to claim 19, further comprising:

directly applying the adjustment factor value $M_{a,l}^{t}$ to determine $\Delta w_{post=a,pre}^{t}$;
wherein:
$w_{post=a,pre}^{l,t}$ is the weight value connecting a node pre in layer l-1 (pre) to the node a in layer l (post=a), at time step t.

21. The neural network training system according to claim 18, wherein the local update factor value $M_{a,l}^{t}$ specific for each weight value of the connections in one layer of connections is neutral for at least one upstream layer of the connections in the neural network.

22. The neural network training system according to claim 18, wherein the update value $M_{a,l}^{t}$ specific for each weight value of the connections in one layer of connections is neutral for all upstream layers of the connections in the neural network.

23. The neural network training system according to claim 22, wherein the updating of the weight values of connections specific for each node in each layer comprises:

multiplying the gradient value derived from the feedback signal with an adjustment factor value $M_{a,l}^{t}$.

24. A computer program product for a training of a neural network, the neural network comprising nodes and weighted connections between selected ones of the nodes, wherein a function of a desired activity and a current activity during training results in a feedback signal that is used for adjusting weight values of the connections, the computer program product comprising:

a computer readable storage medium having program instructions embodied therewith, the program instructions being executable by one or more computing systems or controllers to cause the one or more computing systems to:

receive training data by the neural network at a first input layer;

for every update cycle, determine, by the one or more computing systems, an importance value for each node of each layer in the neural network by adding an income weight value to the node as an absolute value;

for each node in each layer in the neural network, calculate, by the one or more computing systems, values of an adjustment matrix as a ratio between the importance value of the node in the layer and a maximum importance among all postsynaptic neurons in the layer multiplied by two and lower bounded by one;

calculate, by the one or more computing systems, a local update value of the adjustment matrix for each node in each layer of the neural network as ratio between the importance value of the node in the layer and the maximum importance among all neurons in the layer multiplied by two and lower bounded by one;

for each node in each layer of the neural network, calculate, by the one or more computing systems, a local update value by a combination of a gradient value derived from a feedback signal for each weighted connection corresponding element of the adjustment matrix, the feedback signal representing a function of a desired activity and a current activity of each of the weighted connections during training, and the gradient value being a direction in a multi-dimensional space pointing at least in part to a direction of a minimum in a parameter space of a learning neural network; and propagate, by the one or more computing systems, the local update values through the neural network to update each of the weighted connections during every update cycle.

* * * * *